Patented Sept. 10, 1935

2,014,107

UNITED STATES PATENT OFFICE 2,014,107

PROCESS FOR THE PRODUCTION OF PRINTING ROLLS

Leander H. Harrison, New York, N. Y.

No Drawing. Application February 28, 1934, Serial No. 713,301

4 Claims. (Cl. 18—55)

My invention relates to rolls adapted for printing and refers particularly to rubber rolls suitable for the purpose indicated.

While the advantages incident to the employment of rubber rolls for printing purposes are generally recognized, considerable difficulty has been experienced in producing rubber rolls which will give uniform print results.

This difficulty is due primarily to the fact that the impressions, or embossings, necessary for the production of print effects must be incorporated in the unvulcanized rubber and the subsequent necessary vulcanization causes expansions and contractions of the rubber resulting in an uneven thickness of the rubber tube, or blanket, and hence, imperfect and uneven print effects are produced when the tube, or blanket, is placed upon a printing mandrel and impressed by revolution upon paper.

Attempts have been made to overcome this serious defect by controlling the ingredients of the rubber stock and by controlling the time and temperature of the vulcanizing process, but none of these has proved satisfactory.

It is evident that there is a limit in the ability to change the contents of the rubber stock, as the resulting roll must have definite softness and resiliency and that the actual results of the vulcanization step cannot be determined until the material has been removed from the vulcanizing chamber.

I have overcome these previously unsurmountable difficulties and have invented a process whereby the rubber printing roll after vulcanization may be mechanically converted into a tube, or blanket, of uniform thickness with respect to the impressions or embossings thereof, and further may be produced in such a manner that the entire embossed, or printed, space thereof is of absolute uniform distance from the axis of rotation of the printing mandrel carrying the printing tube, or blanket.

It is evident, therefore, that my process allows of the production of rubber printing rolls possessing absolute printing perfectness not dependent upon the necessity of endeavoring to change the contents of the rubber stock or of control of the vulcanizing process.

In order that the various steps incident to the following of my process may be clearly understood I explain them as follows:

Step 1

An original embossed mould of the desired design consisting of an electrotype, etching, line-cut, engraving or similar device is coated with soap, black lead or other suitable material in order to prevent its adhesion to rubber, bakelite or other desired moulding material.

Step 2

The embossed side of the original mould prepared as described under Step 1 is covered by a sheet of unvulcanized hard rubber stock and the two are then placed within a vulcanizing press and the rubber is vulcanized until it is "formed" but is still flexible and the original mould is removed.

When it is desired to produce a continuity, or repetition, of this design in order to obtain a final plate for this purpose, this step is repeated until the required number of hard rubber plates is obtained.

Precaution should be taken that the thickness of the unvulcanized hard rubber sheet is such that the vulcanized sheet is of the required thickness.

Step 3

The semi-vulcanized hard rubber sheets thus produced are trimmed and cemented around the mandrel of metal, wood or other suitable material with the embossed side exposed. The mandrel must be of such diameter that the sheets will exactly abut upon each other and the pattern embossed thereon shall be continuous and without interruption.

Step 4

The exposed embossed surface of the semi-vulcanized hard rubber plate formed as described is then treated with soap, black lead or other suitable material to prevent its adhesion to the rubber employed in the further steps of procedure.

Step 5

A sheet of unvulcanized soft rubber is now wrapped around the covered mandrel, tightly wrapped with a fabric, or other suitable material, and placed in a vulcanizer, the vulcanization being carried to the point where the hard rubber or the soft rubber is completely "cured", whichever requires the longer or greater heat.

If it is desired to make the produced vulcanized soft rubber tube more rigid and less liable to stretch, longitudinal strips of fabric or other suitable material may be incorporated.

It has been found from experience that frequently the first tube thus produced is not as satisfactory as those produced later, due probably to the removal of all excess sulphur from the hard rubber plates, and hence, it may be found advisable at times to discard the first produced tube and employ the second and following ones for the further steps of my process.

Step 6

The mandrel covered with the vulcanized hard rubber and vulcanized soft rubber is now placed on a grinding machine and the unembossed face of the vulcanized soft rubber is ground to the desired thickness.

Step 7

The tube of vulcanized soft rubber is stripped from the vulcanized hard rubber which is maintained on the mandrel, the tube being turned inside out during this process and hence now having its embossed face exposed.

Step 8

The vulcanized soft rubber tube thus formed, one face of which is ground smooth and the other face of which is embossed is now placed with its smooth face exposed upon a mandrel of metal, wood, rubber or other suitable material and the smooth face again ground to the desired size. It will be noted that the embossed side of the tube now abuts upon the hard face of the mandrel and hence the grinding down of the smooth face will produce a uniform thickness of the tube with respect to the embossings.

The diameter of this mandrel must be true from end to end and the surface must be concentric with the spindle.

Step 9

The tube of vulcanized soft rubber is now removed from the mandrel, placed upon the same, or another mandrel of exactly the same size, embossed side exposed, and firmly attached thereto by cement, nails, vulcanization or other suitable means, and is now in condition for printing purposes.

From among the valuable features incident to my process, the following are particularly noted:

1. The plates and covered mandrel formed according to Steps 1 to 5 can be retained and used repeatedly for the production of additional printing rolls, thus enabling the production of repeat orders without the necessity of carrying a stock of vulcanized soft rubber tubes or printing rolls.

2. The thickness of the vulcanized soft rubber printing tube is uniform throughout with respect to the embossings, and the embossings thereon are of uniform distance from the axis of rotation of the printers' roll, thus insuring uniform and clear impressions.

3. It is particularly valuable for the production of print rolls adapted for continuous design printing, as rolls produced by my process, because of their uniformity of design and uniformity of thickness, will produce designs of absolute uniformity in continuity and depth of ink impressions.

It will thus be seen that my process possesses many new and valuable features and is a great advance in the production of rubber printing rolls.

I do not limit myself to the particular materials or steps of procedure described in my specification, as these are mentioned simply to describe the process of my invention.

What I claim is:—

1. In the production of rubber printing rolls, the steps which consist in covering an embossed mould with a sheet of unvulcanized hard rubber stock, placing them in a vulcanizing press, vulcanizing until the hard rubber is semi-vulcanized and is still pliable, removing the said semi-vulcanized pliable plate from said mould, cementing it around a mandrel with the embossed side exposed, covering the embossed side thereof with unvulcanized soft rubber, incorporating longitudinal strips of comparatively non-stretchable material, wrapping a material around the same and vulcanizing removing said vulcanized soft rubber tube from said mandrel and cementing said tube upon a mandrel with the embossed face exposed.

2. In the production of rubber printing rolls, the steps which consist in covering an embossed mould with a sheet of unvulcanized hard rubber stock, placing them in a vulcanizing press, vulcanizing until the hard rubber is semi-vulcanized and is still pliable, removing the said semi-vulcanized pliable plate from said mould, cementing it around a mandrel with the embossed side exposed, covering the embossed side thereof with unvulcanized soft rubber, wrapping a material around the same, vulcanizing, removing said vulcanized soft rubber tube from said mandrel and cementing said tube upon a mandrel with the embossed face exposed.

3. In the production of rubber printing rolls, the steps which consist in covering an embossed mould with a sheet of unvulcanized hard rubber stock, placing them in a vulcanizing press, vulcanizing until the hard rubber is semi-vulcanized and is still pliable, removing the said semi-vulcanized pliable plate from said mould, cementing it around a mandrel with the embossed side exposed, covering the embossed side thereof with unvulcanized soft rubber, wrapping a material around the same, vulcanizing, grinding the exposed smooth surface of the vulcanized soft rubber, removing the vulcanized soft rubber tube from the mandrel, placing said tube upon a mandrel with the smooth face thereof exposed, grinding said exposed surface, removing said vulcanized soft rubber tube from said mandrel and cementing said tube upon a mandrel with the embossed face exposed.

4. In a production of rubber printing rolls, the steps which consist in covering an embossed mould with a sheet of unvulcanized hard rubber stock, placing them in a vulcanizing press, vulcanizing until the hard rubber is semi-vulcanized and is still pliable, removing the said semi-vulcanized pliable plate from said mould, cementing it around a mandrel with the embossed side exposed, covering the embossed side thereof with unvulcanized soft rubber, incorporating longitudinal strips of comparatively non-stretchable material, wrapping a material around the same, vulcanizing, grinding the exposed smooth surface of the vulcanized soft rubber, removing the vulcanized soft rubber tube from the mandrel, placing said tube upon a mandrel with the smooth face thereof exposed, grinding said exposed surface, removing said vulcanized soft rubber tube from said mandrel and cementing said tube upon a mandrel with the embossed face exposed.

LEANDER H. HARRISON.